July 11, 1967   K. COLBOW   3,331,036
OPTICAL WAVE MODULATORS AND ATTENUATORS
Filed Oct. 5, 1964

INVENTOR
K. COLBOW
BY
*Sylvan Sherman*
ATTORNEY

United States Patent Office 3,331,036
Patented July 11, 1967

3,331,036
OPTICAL WAVE MODULATORS AND
ATTENUATORS
Konrad Colbow, Madison, N.J., assignor to Bell Telephone Laboratories, Incorporated, New York, N.Y., a corporation of New York
Filed Oct. 5, 1964, Ser. No. 401,293
3 Claims. (Cl. 332—7.51)

ABSTRACT OF THE DISCLOSURE

This application discloses an electromagnetic wave modulator applicable to optical and microwave signals. In particular, a signal wave of appropriate frequency can be modulated by passing it through a compensated semiconductor element having donor-acceptor pairs and applying a modulating voltage across the element. Radiation having a frequency corresponding to the energy separation between the donor-acceptor pairs in the compensated element can thus be modulated. The modulation effect is attributable to a shift in the absorption coefficient due to the effect of the applied voltage on the energy separations of the donor-acceptor pairs. The results of experiments using doped gallium phosphide as the compensated semiconductor element are also disclosed.

---

This invention relates to electromagnetic wave apparatus and, in particular, to optical modulators and attenuators using semiconductor materials.

It is known that the optical absorption curve of a substantially pure element of semiconducting or insulating material is characterized by a sharp drop in the absorption coefficient for optical frequencies below that for which the photon energy of the incident wave equals the energy gap of the material. As is further pointed out by R. C. Eden and P. D. Coleman in their article entitled, "Proposal for Microwave Modulation of Light Employing the Shift of Optical Absorption Edge With Applied Electric Field," published in the December 1963 issue of the Proceedings of the Institute of Electrical and Electronics Engineers, pages 1776 and 1777, if the element is subjected to an electric field, the absorption curve is shifted and, as a result, the transparency to light near this edge is changed. Such a device can, in principle, be used as a light modulator. The difficulty with such a device, however, resides in the relatively large electric field required to produce a significant change in light absorption.

In accordance with the present invention, improvements in optical modulators and attenuators are obtained by the inclusion of acceptor and donor impurities in significant amounts in a semiconductor element. Preferably, though not necessary, donor and acceptor impurities are present in substantially equal amounts. The resulting "compensated" material is characterized by a new absorption region extending over a band of frequencies somewhat lower than the frequency corresponding to the energy gap of the pure material. As this frequency band is a function of an externally applied electric field, variations in the electric field cause corresponding variations in the transparency of the material to optical wave energy whose frequency lies within the new absorption region. Thus, a compensated material can be used to modulate or to attenuate an applied light beam.

It has been discovered that, in accordance with the present invention, changes in transparency can be produced with variations in applied field that are an order of magnitude smaller than are required to produce equal changes in transparency in prior art devices as typified by those described in the above-cited article.

Figure 1:
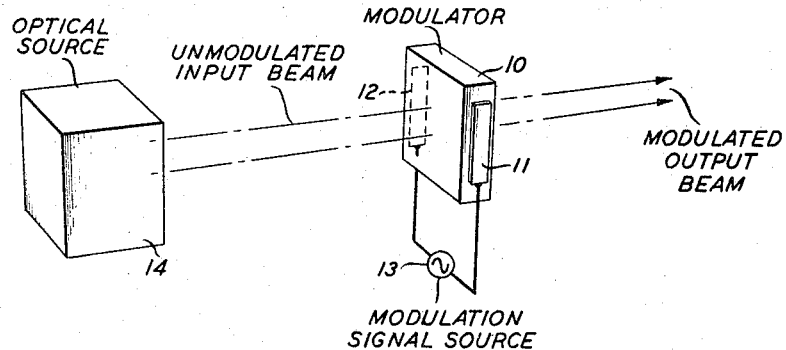
Figure 2:
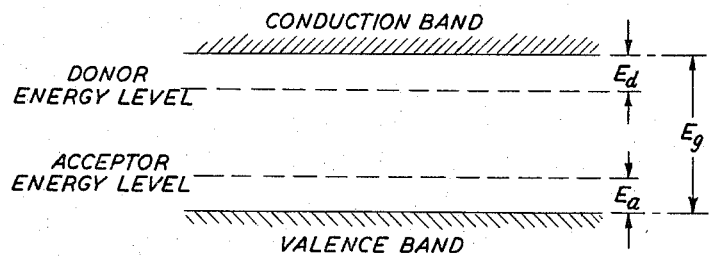
Figure 3:
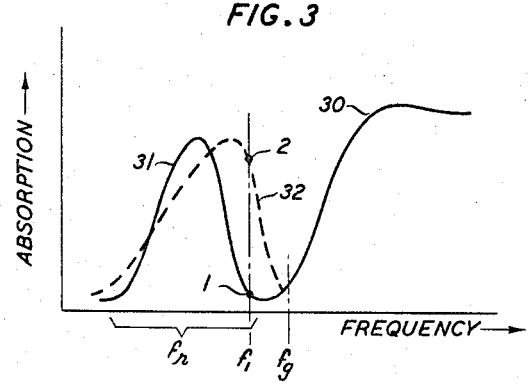

This and other advantages, the nature of the present invention, and its various features, will appear more fully upon consideration of the detailed description given hereinbelow in connection with the accompanying drawings in which:

FIG. 1 is an illustrative embodiment of the present invention using a semiconductor material including both acceptor and donor impurities in significant amounts as an optical wave modulator;

FIG. 2, given for purposes of explanation, is an energy level diagram of a semiconductor material including both acceptor and donor impurities; and FIG. 3 shows the absorption band produced by a semiconductor material used in the embodiment of FIG. 1.

Referring to the drawings, there is shown in FIG. 1 an illustrative embodiment of a modulator, in accordance with the invention, comprising a semiconductor element 10, which includes both acceptor and donor impurities in significant amounts, and means for impressing an external electric field across said element. While element 10 can be either monocrystalline, polycrystalline, or a powder, preferably a monocrystalline element is used.

The particular structure for applying the electric field depends upon the frequency of the modulating signal. In the embodiment of FIG. 1, a pair of metallic electrodes 11 and 12, located on opposite side surfaces of the element 10, are used. As the direction of the electric field is immaterial to the operation of the present invention, the electrodes could just as readily have been placed adjacent to any pair of surfaces. However, for most efficient operation, the electrodes are advantageously located on opposite surfaces. A modulation source 13 is connected between the two electrodes 11 and 12.

The beam to be modulated is projected from a source 14 of coherent wave energy through the element 10. Source 14 can be of any suitable form capable of producing wave energy at a frequency within the absorption band of element 10. This frequency can be made to fall within the infrared, visible or ultraviolet portion of the frequency spectrum, hereafter referred to collectively as the optical portion of the frequency spectrum. Typically, source 14 is an optical maser of the general type described, for example, by Schawlow and Townes in United States Patent 2,929,922 or, more recently, in an article by A. Yariv and J. P. Gordon, entitled "The Laser," published in the January 1963 issue of the Institute of Electrical and Electronics Engineers. Alternatively, source 14 can be an intermediate amplifying station in an optical wave transmission system.

Under the influence of the modulating signal supplied by source 13, the transparency of element 10 to the incident beam is varied, producing a modulated output beam.

The operation of the present invention can be best understood by reference to FIG. 2, which is an energy level diagram of the semiconductor element 10. The diagram shows the energy gap, $E_g$, between the conduction band and the valence band of the semiconductor material, and the energy levels occupied by the donor and acceptor impurities. Advantageously, the impurities are present in substantially equal amounts, although differences of the order of ten to one appear not to unduly affect the operation of such devices. The donor and acceptor ionization energies are represented by $E_d$ and $E_a$, respectively. To minimize the tendency for free electrons or free holes to be formed, the product $kT$, where $k$ is Boltzmann's constant and $T$ is the absolute temperature, is made less than both $E_d$ and $E_a$. Thus, depending upon the material used and the ambient temperature, the modulator may advantageously be cooled to satisfy the above-mentioned condition.

The interaction between acceptor and donor impurities results in a modification of the energy level systems such that the energy separation $E_{(r)}$ between donor and acceptor levels, for a particular hole-electron pair in the absence of a modulating signal, is given by $$E_r = E_g - (E_d + E_a) + \frac{e^2}{\epsilon r} \quad (1)$$

where $e$ is the electron charge
$\epsilon$ is the static dielectric constant of the material and $r$ is the distance between a particular acceptor and donor pair and is a function of impurity concentration.

It should be noted that the distance $r$ and, hence, the difference is energy levels, $E_{(r)}$, given by Equation 1, is for a particular hole-electron pair. Because the distance $r$ is not a unique value, but varies within the material (usually in a random statistical distribution) the energy separation $E_{(r)}$ for the material as a whole, is a distribution. Similarly, energy absorption takes place over a band of frequencies corresponding to the distribution of energy separations. Thus, it shall be understood hereinafter, that when reference is made to the energy separation of the material or its equivalent frequency $f_{(r)}$, it is the distribution of energy level differences and the corresponding band of frequencies that is being referred to. Typically, the latter is of the order of 100 to 400 A. wide.

In the absence of an applied optical signal (the unexcited state) the material contains ionized donor and acceptor impurities as previously bound electrons have dropped into neighboring bound holes. This involves a transition from a donor energy level to an acceptor energy level with an accompanying emission of energy. If a signal is now applied at a frequency corresponding to an energy within the energy separation $E_{(r)}$, but less than the energy gap $E_{(g)}$, energy is absorbed from the applied signal by electrons bound to acceptor impurities and the electrons, in turn, are pumped from the acceptor site to a neighboring donor site. The signal is correspondingly attenuated, and leaves the modulator element 10 at a lower amplitude.

The overall response characteristic of a modulator in accordance with the present invention, is shown in FIG. 3. Curve 30 is the absorption characteristic referred to in the above-cited article by Eden and Coleman. This curve rises sharply for frequencies above $f_g$, the frequency corresponding to the energy gap $E_g$. Curve 31 is the new absorption band, produced in accordance with the teaching of the present invention, and corresponds to the energy distribution $E_{(r)}$ as given by Equation 1 for all electron-hole pairs. As can be seen the modulator of FIG. 1 is operative over a range of frequencies with this band and less than $f_g$.

If an electric field is now applied to the modulator element 10, the donor and acceptor levels are shifted relative to each other, thereby changing $E_{(r)}$. The magnitude of this change is of the order of $$\Delta E_{(r)} = erV \cos \theta \quad (2)$$

for a particular pair whose $r$ vector is at an angle $\theta$ with the electric field direction; and where V is the amplitude of the internal electric field resulting from the applied field. The donor-acceptor energy separation in the presence of a modulating signal is then given by $$E'_{(r)} = E_g - (E_A + E_d + \frac{e}{\epsilon r} + erV \cos \theta) \quad (3)$$

Thus, as the amplitude and polarity of V changes, $E'_{(r)}$ for each individual donor-acceptor pair changes. Since there are as many donor-acceptor pairs (dipoles) for which $\cos \theta$ is negative as there are pairs for which it is positive, there will be as many donor-aceptor pairs for which $E'_{(r)}$ decreases as there are pairs for which $E'_{(r)}$ increases. Accordingly, one effect of the application of the modulating field is to broaden the absorption characteristic curve 31. If $\cos \theta$ is averaged for all $\theta$, one obtains ½, so that the average increase in line width is of the order of ½ $erV$.

There is, however, an additional effect which takes place and which affects the shape of the absorption curve. This second effect has to do with the change in the recombination kinetics due to the distortion of the hole and electron orbits by the electric field, which tends to shift the curve towards the higher frequencies. The net total effect is, thus, to both broaden and shift the absorption characteristics from that illustrated by curve 31 to that illustrated by curve 32. As can be seen, an optical wave at frequency $f_1$, experiences relatively little attenuation when no modulating signal is applied, as indicated by point 1 on curve 31, whereas the same signal experiences substantial attenuation when a modulating electric field is applied, as indicated by point 2 on curve 32.

In the design of a modulator, in accordance with the present invention, two conflicting effects must be considered. On one hand, there is the amount of attenuation that can be produced, which is a function of the impurity concentration. In any given size crystal, the greater the concentration, the greater the attenuation. On the other hand, there is the modulation sensitivity, which is a function of the average distance $r$ between the donor and acceptor atoms. From Equation 2 it is seen that the greater the distance, the greater the modulation sensitivity, or the smaller the modulating voltage required to produce a given change in transmission through the crystal. The distance $r$, however, varies inversely as the cube root of the concentration, decreasing as the concentration increases. Advantageously, concentrations of the order of $10^{15}$ to $10^{19}$ atoms per cm.$^3$ are used and this range shall constitute "a significant amount" for purposes of the claims. Below $10^{15}$ the attenuation becomes too small, whereas above $10^{19}$ the properties of the semiconductor material are adversely affected.

In the specific embodiment of the invention, a crystal of gallium phosphide (GaP) having a length of 0.1 mm. in the direction of wave propagation was used. The crystal, which was doped with approximately $10^{18}$ atoms of silicon and $10^{18}$ atoms of sulphur per cm.$^3$, produced an absorption peak at 5636 A. The application of a transverse modulating field of 3000 v./cm. (600 v. across electrodes 0.2 mm. apart) resulted in a 7 A. shift in the higher frequency side of the absorption band and a 30 percent reduction in transmission of a wave tuned to the center of the higher frequency side of the absorption band.

As indicated earlier, the manner in which the modulating field is best applied to the modulator material is a function of the frequency of the modulating signal. The arrangement of FIG. 1 would be used at relatively low frequencies. At microwave frequencies, on the other hand, the element 10 would advantageously be located within a waveguiding structure, such as a rectangular, conductively bounded waveguide.

Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:
1. In combination;
   a compensated semiconductor element containing concentrations of both acceptor and donor impurities of the order of $10^{15}$ to $10^{19}$ atoms per cubic centimeter throughout said semiconductor element;
   said element characterized by the presence of donor-acceptor impurity pairs;

means for impressing an electric field across said element;

and a source of optical wave energy having a frequency within the frequency band defined by the distribution of energy level differences between donor-acceptor impurity pairs directed upon said elements.

2. An optical wave modulator comprising:

a compensated semiconductor element containing concentrations of both acceptor and donor impurities of the order of $10^{15}$ to $10^{19}$ atoms per cubic centimeter throughout said semiconductor element;

said element characterized by an energy separation distribution between said impurities;

means for impressing a modulating electric field across said element;

and a source of coherent optical wave energy having frequency within the band of frequencies equivalent to said energy separation distribution directed upon said element.

3. The modulator according to claim 2 wherein said donor and acceptor impurity concentrations are each approximately $10^{18}$ atoms per cubic centimeter of material.

References Cited

UNITED STATES PATENTS

| 2,692,950 | 10/1954 | Wallace. | |
|---|---|---|---|
| 2,929,923 | 3/1960 | Lehovec | 250—199 X |
| 3,121,203 | 2/1964 | Heywang | 332—7.51 |
| 3,158,746 | 11/1964 | Lehovec. | |

OTHER REFERENCES

Kessler et al.: "Modulation of Recombination Radiation," IBM Technical Disclosure Bulletin, vol. 6, No. 1, page 112.

ROY LAKE, *Primary Examiner.*

ALFRED BRODY, *Examiner.*